Figures 1, 2:
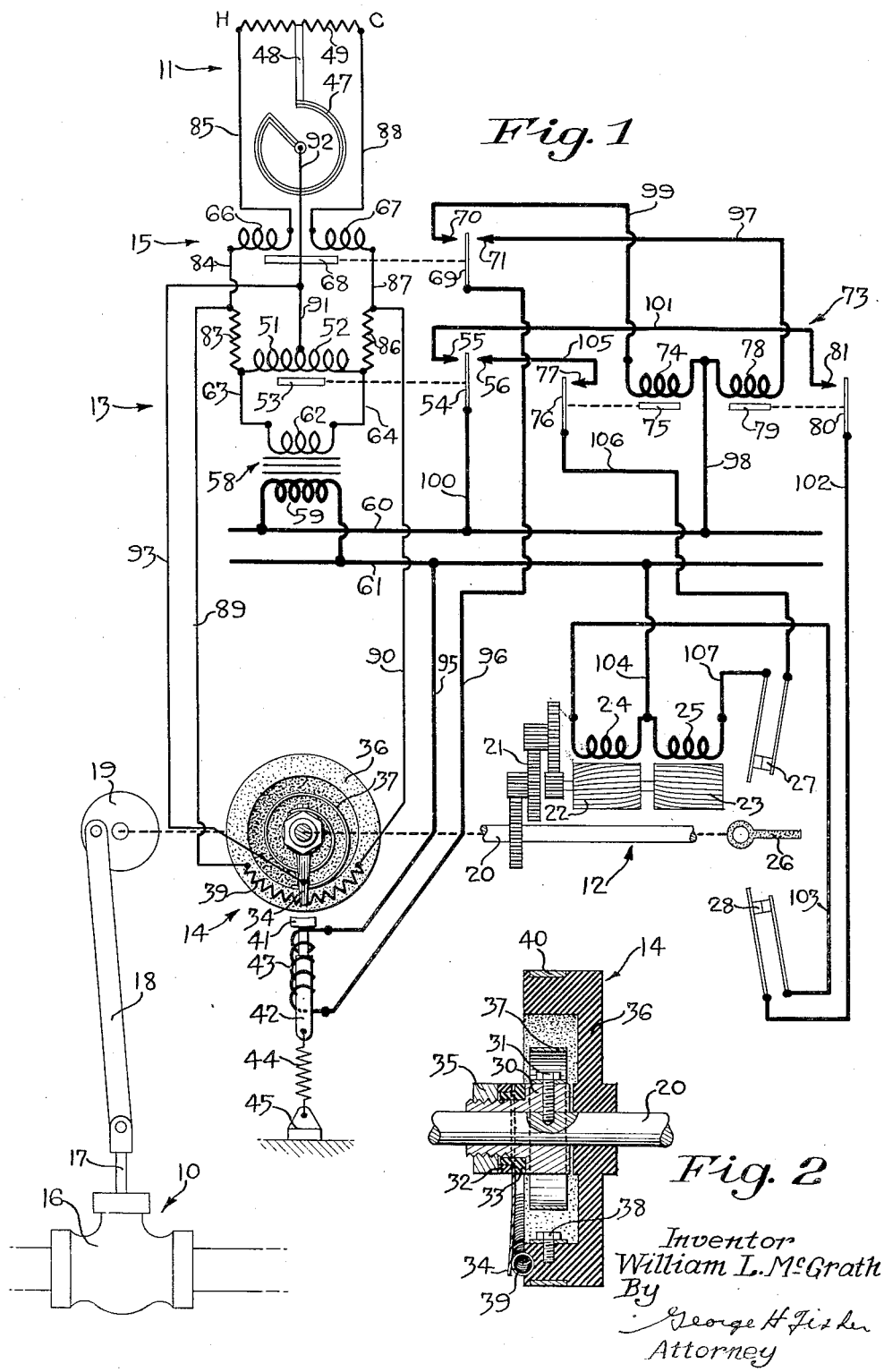

July 23, 1940. W. L. McGRATH 2,208,563
AUTOMATIC RESET MECHANISM
Filed Nov. 23, 1936

Inventor
William L. McGrath
By George H. Fisher
Attorney

Patented July 23, 1940

2,208,563

UNITED STATES PATENT OFFICE 2,208,563

AUTOMATIC RESET MECHANISM

William L. McGrath, St. Paul, Minn., assignor to Minneapolis-Honeywell Regulator Company, Minneapolis, Minn., a corporation of Delaware Application November 23, 1936, Serial No. 112,329

11 Claims. (Cl. 236—78)

This invention relates to automatic reset or load compensation mechanisms in general and more particularly to that type of mechanism as applied to a follow-up or rebalancing control system.

It is an object of this invention to provide a follow-up control system for controlling the value of a condition having associated therewith a reset mechanism of novel construction and mode of operation whereby the condition to be controlled is maintained within narrower limits than could be obtained by the conventional follow-up or rebalancing control system.

The construction, the combination of elements, and the mode of operation for obtaining the desired results also form objects of this invention.

For a more thorough understanding of this invention, reference is made to the accompanying sheet of drawings in which:

Figure 1 diagrammatically discloses the reset mechanism of this invention as applied to an electrically balanced control system.

Figure 2 is a sectional view of the construction of a portion of the mechanism shown in Figure 1.

A device generally designated at 10 controls the value of the condition to be controlled. A condition responsive means generally designated at 11 responds to changes in the value of the condition being controlled and has a desired normal state corresponding to a desired normal value of the condition being controlled. The device 10 which controls the value of the condition may be operated by means of a motor generally designated at 12 and this motor may be operated by a balanced relay mechanism generally designated at 13. The relay mechanism 13 is unbalanced by the condition responsive device 11 and is rebalanced by means of a rebalancing device generally designated at 14, this rebalancing device being operated in a manner to be pointed out hereinafter by the motor 12. A second relay mechanism generally designated at 15 also controls the operation of the motor 12 and also provides a control over the rebalancing mechanism generally designated at 14.

Although the condition to be controlled may be any desired condition, it is disclosed in this application as being a temperature condition. For instance, this mechanism may be applied to a temperature control system for a space whereupon the condition controlling means 10 may comprise a valve 16 controlling the supply of heating fluid to the space for controlling the temperature thereof. The valve 16 may be operated by a valve stem 17 which is connected by a pitman 18 to a crank disc 19 mounted on a shaft 20 of the motor 12. The shaft 20 is operated through a reduction gear train 21 by motor rotors 22 and 23 which, in turn, are influenced by field windings 24 and 25, respectively. The arrangement is such that when the field winding 24 is energized, the valve 16 is moved towards an open position and when the field winding 25 is energized, the valve 16 is moved towards a closed position. The shaft 20 also operates an abutment member 26 preferably made of insulating material for opening limit switches 27 and 28 when the valve 16 is moved to either an extreme closed position or an extreme open position.

The balancing mechanism generally designated at 14 is also operated by the shaft 20 of the motor and may comprise a collar 30 secured to the shaft 20 for rotation therewith by means of a screw 31. Insulating washers 32 and 33 carry between them a slider 34, the slider and the insulating washer being rigidly secured to the collar 30 for rotation therewith by a nut 35 screw-threaded on the collar 30. Therefore, when the shaft 20 is rotated, the slider 34 is rotated concurrently therewith. Loosely mounted on the shaft 20 is a cylindrical member 36 preferably made of insulating material. A spiral spring 37 is secured to the collar 30 by the screw 31 and is secured to the member 36 by a screw 38. The member 36 carries a resistance element 39 which is adapted to be contacted by the slider 34. The spiral spring 37 is so arranged that the resistance element 39 is centered with respect to the slider 34. In other words, the spring 37 normally maintains the slider 34 in a mid position with respect to the resistance element 39. The slider 34 and the resistance element 39 form a balancing potentiometer, the operation of which will be pointed out more fully hereafter. The member 36 also carries a brake band 40 which is adapted to be engaged by a brake shoe 41 carried by an armature 42. The armature is influenced by a winding or coil 43. The brake shoe 41 is held out of engagement with the brake band 40 by a tension spring 44 suitably secured to an anchor member 45. When the winding 43 is energized, the brake shoe 41 is moved into engagement with the brake band 40 against the action of tension spring 44 and when the winding 43 is deenergized, the spring 44 moves the brake shoe out of engagement with the brake band 40. When the brake shoe 41 is in engagement with the brake band 40, rotation of the member 36 and, consequently, the resistance element 39 is prevented and when the brake shoe 41 is moved out of engagement with the brake band 40, the spring 37 immediately centers the slider 34 with respect to the resistance element 39.

The means responsive to the condition to be controlled is shown to be a themostatic means having a thermostatic element 47 responsive to the temperature of the space. The thermostatic element 47 operates a slider 48 with respect to a potentiometer resistance 49 and the parts are preferably arranged so that the slider 48 assumes a position midway between the ends of the resistance element 49 when the value of the condition or the temperature of the space is at the desired normal value.

The relay 13 may comprise series connected relay coils 51 and 52 which influence an armature 53. The armature 53 is connected in any suitable manner to a switch arm 54 which is adapted to engage contacts 55 and 56. When the relay coil 51 is energized more than the relay coil 52, the switch arm 54 is moved into engagement with the contact 55 and when the relay coil 52 is energized more than the relay coil 51, the switch arm 54 is moved into engagement with the contact 56. When the relay coils 51 and 52 are equally energized, the switch arm 54 is spaced midway between the contacts 55 and 56 in the position shown in Figure 1. Power is supplied to the relay 13 by means of a suitable transformer 58 having a primary 59 connected across line wires 60 and 61 and a secondary 62. The left end of the secondary 62 is connected by a wire 63 to the left end of the relay coil 51, and the right end of the secondary 62 is connected by a wire 64 to the right end of the relay coil 52. The inner ends of the relay coils 51 and 52 are connected together. In this manner, the relay coils 51 and 52 are connected in series and across the secondary 62.

The relay generally designated at 15 comprises relay coils 66 and 67 for operating an armature 68 which is suitably connected to a switch arm 69. When the relay coil 66 is energized more than the relay coil 67, the switch arm 69 is moved into engagement with the contact 70 and when the relay coil 67 is energized more than the relay coil 66, the switch arm 69 is moved into engagement with a contact 71. When the relay coils 66 and 67 are equally energized, the switch arm 69 is located midway between contacts 70 and 71.

This invention also contemplates the use of another relay generally designated at 73, and this relay may comprise a relay coil 74 for operating an armature 75 which moves a switch arm 76 into engagement with a contact 77 when the relay coil 74 is energized. Also, the relay 73 includes a relay coil 78 for operating an armature 79 which moves a switch arm 80 into engagement with a contact 81 when the relay coil 78 is energized.

The left end of the relay coil 51 is connected by a protective resistance 83 and a wire 84 to the left end of the relay coil 66 and the right-hand end of the relay coil 66 is connected by a wire 85 to the left end of the potentiometer resistance 49. In a like manner, the right end of the relay coil 52 is connected by a protective resistance 86 and a wire 87 to the right end of the relay coil 67. The left end of the relay coil 67 is connected by wire 88 to the right end of the potentiometer resistance 49. The left end of the balancing potentiometer resistance 39 is connected by a wire 89 to the junction of the protective resistance 83 and the wire 84, and in a like manner, the right end of the balancing potentiometer resistance 39 is connected by a wire 90 to the junction of the protective resistance 86 and the wire 87. The junction of the series connected coils 51 and 52 is connected by wires 91, 92 and 93 to the slider 48 of the control potentiometer and to the slider 34 of the balancing potentiometer.

From the above wiring connections, it is seen that the control potentiometer 11, the balancing potentiometer 14, and the relay 13 are all connected in parallel and across the secondary 62 of the step-down transformer 58. It is also seen that the relay coils 66 and 67 are connected in series with the ends of the control potentiometer resistance 49.

With the parts in the position shown in Figure 1, the slider 48 is in a mid position with respect to its resistance element 49 and the slider 34 is in a mid position with respect to its resistance element 39. By reason of the parallel relationship pointed out above, the relay coils 51 and 52 are equally energized and the relay coils 66 and 67 are equally energized. The motor is, therefore, in a stationary position and it is assumed that the valve 16 is in a mid position which supplies just the correct amount of heat to the space to maintain the space temperature at the desired value. Upon an increase in the load on the heating system, the space temperature decreases and consequently the slider 48 is moved to the right from its desired normal position in the direction indicated by the character C. This right-hand movement of the slider 48 increases the current flow through the relay coil 67 and decreases the current flow through the relay coil 66 whereupon the switch arm 69 is moved into engagement with the contact 71 to complete a circuit from the line wire 61 through wire 95, winding 43 of the magnetic brake, wire 96, switch arm 69, contact 71, wire 97, relay coil 78, and wire 98 back to the other line wire 60. Completion of this circuit causes movement of the brake shoe 41 into engagement with the brake band 40 to hold stationary the balancing resistance element 39 and also causes movement of the switch arm 80 into engagement with the contact 81.

Movement of the slider 48 to the right also causes partial short circuiting of the relay coil 52 to decrease the energization thereof and increase the energization of the relay coil 51. This inequality of the energizations of the relay coils 51 and 52 causes movement of the switch arm 54 into engagement with the contact 55 to complete a circuit from the line wire 60 through wire 100, switch arm 54, contact 55, wire 101, contact 81, switch arm 80, wire 102, limit switch 28, wire 103, field winding 24, and wire 104 back to the other line wire 61. Completion of this circuit causes energization of the field winding 24 to move the valve 16 towards an open position to supply additional heat to the space.

Movement of the valve 16 towards an open position also causes movement of the slider 34 to the left with respect to the balancing potentiometer resistance 39 since the balancing resistance 39 is held stationary by the brake shoe 41. This left-hand movement of the slider 34 causes partial short circuiting of the relay coil 51 to decrease the energization thereof and to increase the energization of the relay coil 52. When the energizations of the relay coils 51 and 52 become equal by reason of this rebalancing action of the balancing potentiometer, the switch arm 54 is moved out of engagement with the contact 55 to stop operation of the motor 12 to maintain the valve 16 in its newly adjusted position.

As a result of the additional supply of heat to the space, the space temperature will increase and cause the slider 48 to move to the left towards the normal desired center position shown in Figure 1, which will cause partial short circuiting of the relay coil 51 to decrease the energization thereof and to increase the energization of the relay coil 52. This causes movement of the switch arm 54 into engagement with the contact 56 but no circuit is completed therethrough since the switch arm 76 is out of engagement with the contact 77, the switch arm 76 and the contact 77 being in series with the contact 56. Therefore, the motor 12 will remain stationary and the valve 16 will be maintained in its adjusted position even though the temperature to be controlled is returning toward the desired normal value. When the temperature is returned to the desired normal value, the slider 48 assumes a position midway between the ends of its associated control resistance element 49 and, therefore, the relay coils 66 and 67 will become equally energized to move the switch arm 69 out of engagement with the contact 71. This breaks the circuit to the relay coil 78 to move the switch arm 80 out of engagement with the contact 81 and also breaks the circuit to the winding 43 of the magnetic brake. The brake shoe 41 is moved out of engagement with the brake band 40 and the member 36 and consequently the balancing resistance element 39 are moved in a clockwise direction in such an amount to cause the balancing resistance element 39 to center itself with respect to the balancing slider 34. Since the control slider 48 is at this time in the mid position and the balancing potentiometer slider 34 is in a mid position with respect to its balancing resistance 39, the relay coils 51 and 52 are equally energized and, therefore, the switch arm 54 is out of engagement with the contacts 55 and 56. The motor 12 is stationary and the valve 16 remains in the newly adjusted position even though the condition or temperature to be controlled is restored to the desired normal value. In other words, by this sequence of operation, the valve 16 is positioned farther towards an open position than it was before the sequence of operation took place. The valve 16 is, therefore, reset with respect to the value of the condition or temperature being controlled and the amount of this resetting of the valve 16 is directly proportional to the amount which the condition or temperature to be controlled deviated from the desired normal value.

If the temperature to be controlled increases, which increase may be caused either by too much heating fluid being delivered to the space or by a decrease in load on the heating system, slider 48 is moved toward the left with respect to the control potentiometer resistance 49 in the direction indicated by the character H. This left-hand movement of the slider 48 from the desired normal position increases the current flow through the relay coil 66 and decreases the current flow through the relay coil 67, which causes movement of the switch arm 69 into engagement with the contact 70. Movement of the switch arm 69 into engagement with the contact 70 in this manner completes a circuit from the line wire 61 through wire 95, winding 43 of the magnetic brake, wire 96, switch arm 69, contact 70, wire 99, relay coil 74, and wire 98 back to the line wire 60. Completion of this circuit causes movement of the brake shoe 41 into engagement with the brake band 40 to hold the member 36 and consequently the balancing resistance element 39 stationary and also causes energization of the relay coil 74 to move the switch arm 76 into engagement with the contact 77. Movement of the slider 48 to the left from the desired normal position partially short-circuits the relay coil 51 to decrease the energization thereof and to increase the energization of the relay coil 52. This unequal energization of the relay coils 51 and 52 causes movement of the switch arm 54 into engagement with the contact 56 to complete a circuit from the line wire 60 through wire 100, switch arm 54, contact 56, wire 105, contact 77, switch arm 76, wire 106, limit switch 27, wire 107, field winding 25, and wire 104 back to the other line wire 61. Completion of this circuit causes energization of the field winding 25 to move the valve 16 towards a closed position to decrease the amount of heat being delivered to the space.

Movement of the valve 16 towards a closed position causes movement of the slider 34 to the right with respect to its balancing potentiometer resistance 39 and this right-hand movement of the slider 34 causes partial short circuiting of the relay coil 52 to decrease the energization thereof and to increase the energization of the relay coil 51. When the slider 34 has moved sufficiently far to the right to rebalance the energization of the relay coils 51 and 52, the switch arm 54 is moved out of engagement with the contact 56 to break the circuit to the field winding 25 whereupon further operation of the motor 12 is prevented and the valve 16 is maintained in the newly adjusted position.

The decrease in the supply of heat being delivered to the space causes a decrease in the space temperature towards the desired normal value, and consequently movement of the slider 48 from the left-hand position towards the desired normal mid position. This right-hand movement of the slider 48 causes partial short circuiting of the relay coil 52 to decrease the energization thereof and increase the energization of the relay coil 51 to move the switch arm 54 into engagement with the contact 55. However, no circuit through this contact 55 is at this time completed since the switch arm 80 is out of engagement with the contact 81 and therefore the valve 16 is maintained in this newly adjusted position even though the condition to be controlled is approaching the desired normal value.

When the condition or temperature to be controlled has returned to the desired normal value so as to move the slider 48 to the mid position with respect to its potentiometer resistance 49, the energization of the relay coils 66 and 67 become equal and the switch arm 69 is moved out of engagement with the contact 70. This causes movement of the brake shoe 41 out of engagement with the brake band 40 and the spring 37 causes the balancing potentiometer resistance 39 to center itself with respect to the balancing slider 34. Since the control slider 48 is in mid position, the relay coils 51 and 52 will immediately become equally energized and the switch arm 54 will assume a position midway between its contacts 55 and 56. The relay coil 74 is deenergized by reason of the movement of the switch arm 69 out of engagement with the contact 70 and the circuit to the field winding 25 is broken. Therefore, the valve 16 is maintained in a new position with respect to the value of the condition or temperature being controlled and this new position is further towards a closed position than it was before this cycle of operation was accomplished.

From the above description, it is seen that upon an increase in load causing a decrease in the value of the condition or temperature to be controlled, the valve 16 is moved towards an open position in an amount corresponding to the amount of the deviation from the desired normal value and the valve 16 is maintained in this new position until the value of the condition or temperature to be controlled is restored to the desired normal value. The same mode of operation in the reverse order is brought about by a decrease in the load causing an increase in the value of the condition or temperature to be controlled. By reason of this construction, the valve 16 is not only positioned in accordance with changes in the value of the condition but is reset in accordance with changes in the load affecting this condition whereupon the value of the condition being controlled is maintained within closer limits than could be accomplished by the hitherto known balancing or follow-up control systems. In fact, the condition to be controlled is maintained at substantially the desired value regardless of changes in load affecting the condition and the well known drooping characteristics of a normally balanced or follow-up system is entirely eliminated.

Although I have shown for purposes of illustration one form of my invention, other forms thereof may become apparent to those skilled in the art and, therefore, this invention is to be limited only by the scope of the appended claims and prior art.

I claim as my invention:

1. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by said device, controlled by said control means to position said device in accordance with changes in the state of the control means whereby the value of the condition is maintained within certain limits, means included in said follow-up means for mechanically altering the operation thereof by the device, and means controlled directly by the control means for controlling the last mentioned means to cause said device to be positioned in a different position with respect to the state of the control means.

2. In combination, a device to be positioned in a plurality of positions to control the value of a condition, control impedance means varied in accordance with changes in the value of the condition to be controlled and having a desired normal impedance value corresponding to a desired normal value of the condition, relay means for controlling the operation of the device, balancing impedance means operated by said device, connections between the relay means, the control impedance means and the balancing impedance means, mechanism for mechanically altering the operation of the balancing impedance means by the device, and means controlled directly by the control impedance means for controlling the mechanism.

3. In combination, a device to be positioned in a plurality of positions to control the value of a condition, control impedance means varied in accordance with changes in the value of the condition to be controlled and having a desired normal impedance value corresponding to a desired normal value of the condition, relay means for controlling the operation of the device, balancing impedance means operated by said device, connections between the relay means, the control impedance means and the balancing impedance means, mechanism for mechanically altering the operation of the balancing impedance means by the device, and means located in the connections between the relay means and the control impedance means for controlling the mechanism.

4. In combination, a device to be positioned in a plurality of positions to control the value of a condition, control impedance means varied in accordance with changes in the value of the condition to be controlled and having a desired normal impedance value corresponding to a desired normal value of the condition, relay means for controlling the operation of the device, balancing impedance means operated by said device and having a normal impedance value, connections between the relay means, the control impedance means and the balancing impedance means, and means controlled by the control impedance means for causing operation of said device and operation of the balancing impedance means from the desired normal value as the impedance value of the control impedance means deviates from normal and in accordance with the amount of such deviation, for preventing operation of the device and the balancing impedance means as the impedance value of the control impedance means is returning to normal and for restoring the impedance value of the balancing impedance means to normal when the control impedance means assumes a normal value.

5. In combination, a device to be positioned in a plurality of positions to control the value of a condition, a control resistance means including a resistance element and a slider, means for moving the slider in accordance with changes in the value of the condition to be controlled, said slider having a desired normal position corresponding to a desired normal value of the condition, a relay means controlling the operation of the device, a balancing resistance means having a resistance element and a slider, connections between the control resistance means, the balancing resistance means and the relay means, means for operating the slider of the balancing resistance means upon operation of said device, biasing means for urging the resistance element of the balancing resistance means to a given position with respect to its associated slider, and means directly controlled by the control resistance means for overcoming the biasing means and holding stationary the resistance element as long as the slider of the control resistance means is out of the desired normal position.

6. In combination, a device to be positioned in a plurality of positions to control the value of a condition, a control resistance means including a resistance element and a slider, means for moving the slider in accordance with changes in the value of the condition to be controlled, said slider having a desired normal position corresponding to a desired normal value of the condition, a relay means controlling the operation of the device, a balancing resistance means having a resistance element and a slider, connections between the control resistance means, the balancing resistance means and the relay means, means for operating the slider of the balancing resistance means upon operation of said device, biasing means for urging the resistance element of the balancing resistance means to a given position with respect to its associated slider, electric means adapted when energized to hold the resistance element of the balancing resistance means stationary, and means associated with the connections between the control resistance means and the relay means and responsive to the current flow therethrough for energizing the electric means when the slider of the control resistance means deviates from its normal position.

7. In combination, a device to be positioned in a plurality of positions to control the value of a condition, a control resistance means including a resistance element and a slider, means for moving the slider in accordance with changes in the value of the condition to be controlled, said slider having a desired normal position corresponding to a desired normal value of the condition, a relay means controlling the operation of the device, a balancing resistance means having a resistance element and a slider, connections between the control resistance means, the balancing resistance means and the relay means, means for operating the slider of the balancing resistance means upon operation of said device, biasing means for urging the resistance element of the balancing resistance means to a given position with respect to its associated slider, a solenoid brake adapted when energized to hold the resistance element of the balancing resistance means stationary, and switching means connected to said solenoid brake and responsive to the current flow through said connections for energizing the solenoid brake when the slider of the control resistance means deviates from its normal position.

8. In combination, a device to be positioned in a plurality of positions to control the value of a condition, a control resistance means including a resistance element and a slider, means for moving the slider in accordance with changes in the value of the condition to be controlled, said slider having a desired normal position corresponding to a desired normal value of the condition, a relay means controlling the operation of the device, a balancing resistance means having a resistance element and a slider, connections between the control resistance means, the balancing resistance means and the relay means, means for operating the slider of the balancing resistance means upon operation of said device, biasing means for urging the resistance element of the balancing resistance means to a given position with respect to its associated slider, means controlled by the control resistance means for overcoming the biasing means and holding stationary the resistance element as long as the slider of the control resistance means is out of the desired normal position, and means controlled by the control resistance means for preventing operation of the device when the slider of the control resistance means is returning to the desired normal position following a deviation thereof from the desired normal position.

9. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by the device, controlled by the control means to position said device as the state of the control means deviates from the desired normal state and in accordance with the amount of such deviation, and means for preventing operation of the device as the state of control means is returning to the desired normal state.

10. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by the device, controlled by the control means to position said device as the state of the control means deviates from the desired normal state and in accordance with the amount of such deviation, and means controlled by said control means for preventing operation of the device as the state of the control means is returning to the desired normal state.

11. A reset mechanism comprising in combination, a control mechanism including an element and a member, means for operating the element, a carrier for the member, spring means between the operating means and the carrier to operate the carrier and to cause the member to assume a given position with respect to the element, releasable means for overcoming the spring means and for preventing operation of the carrier whereby the element is moved with respect to the member, and means for releasing the releasable means whereby the spring means immediately returns the member to the given position with respect to the element.

WILLIAM L. McGRATH.